US011250402B1

(12) United States Patent
Morgan et al.

(10) Patent No.: US 11,250,402 B1
(45) Date of Patent: *Feb. 15, 2022

(54) GENERATING AN ONLINE STOREFRONT

(71) Applicant: Square, Inc., San Francisco, CA (US)

(72) Inventors: Timothy Ben Morgan, San Francisco, CA (US); Vanessa Erica Slavich, San Francisco, CA (US); Brielle Alyse Rajkovich, San Francisco, CA (US); Mathew Wilson, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 15/611,219

(22) Filed: Jun. 1, 2017

Related U.S. Application Data

(63) Continuation of application No. 13/829,080, filed on Mar. 14, 2013, now Pat. No. 9,704,146.

(51) Int. Cl.
*G06Q 20/20* (2012.01)
*G06Q 30/06* (2012.01)

(52) U.S. Cl.
CPC ....... *G06Q 20/202* (2013.01); *G06Q 30/0603* (2013.01); *G06Q 30/0643* (2013.01)

(58) Field of Classification Search
None
See application file for complete search history.

(56) References Cited

U.S. PATENT DOCUMENTS

| 5,652,421 A | 7/1997 | Veeneman et al. |
| 5,878,337 A | 3/1999 | Joao et al. |
| 5,960,411 A | 9/1999 | Hailman et al. |

(Continued)

FOREIGN PATENT DOCUMENTS

| AU | 2017235924 A1 | 10/2017 |
| AU | 2019229446 A1 | 10/2019 |

(Continued)

OTHER PUBLICATIONS

Nadiminti, "Distributed Systems and Recent Innovations: Challenges and Benefits", 2006, available at https://www.researchgate.net/publication/240827899_Distributed_Systems_and_Recent_Innovations_Challenges (Year: 2006).*

(Continued)

*Primary Examiner* — Allen C Chein
(74) *Attorney, Agent, or Firm* — Lee & Hayes, P.C.

(57) ABSTRACT

Method, systems, and apparatus for generating a storefront for a merchant, comprising: receiving transaction data associated with a brick and mortar (BOM) transaction, processing a payment for the BOM transaction, updating inventory data based on the transaction data, receiving a request to generate an online storefront for a point of sale system of the merchant, where the point of sale system includes inventory data of a plurality of items for sale, identifying the plurality of items for sale from the inventory data from point of sale system; generating one or more resources for each item of the plurality of items for sale; causing display of the graphical user interface comprising the one or more resources to be presented to enable purchase of an item, and updating the inventory data based on a purchase of the item by the ecommerce customer.

20 Claims, 6 Drawing Sheets

(56) References Cited

U.S. PATENT DOCUMENTS

| | | | |
|---|---|---|---|
| 6,154,738 A | 11/2000 | Call | |
| 6,263,352 B1 | 7/2001 | Cohen | |
| 6,330,544 B1 | 12/2001 | Walker et al. | |
| 6,343,275 B1 | 1/2002 | Wong | |
| 7,085,812 B1 | 8/2006 | Sherwood | |
| 7,155,411 B1 | 12/2006 | Blinn et al. | |
| 7,233,843 B2 | 6/2007 | Budhraja et al. | |
| 7,257,552 B1 | 8/2007 | Franco | |
| 7,376,600 B1 | 5/2008 | Wadawadigi et al. | |
| 7,475,024 B1 | 1/2009 | Phan | |
| 7,478,054 B1 | 1/2009 | Adams et al. | |
| 7,493,390 B2 | 2/2009 | Bobde et al. | |
| 7,552,087 B2 | 6/2009 | Schultz et al. | |
| 7,575,166 B2 | 8/2009 | McNamara | |
| 7,603,382 B2 | 10/2009 | Halt, Jr. | |
| 7,685,023 B1 | 3/2010 | Abraham et al. | |
| 7,764,185 B1 | 7/2010 | Manz et al. | |
| 7,810,729 B2 | 10/2010 | Morley, Jr. | |
| 7,818,809 B1 | 10/2010 | Sobel et al. | |
| 7,853,528 B2 | 12/2010 | Schireson | |
| 8,060,259 B2 | 11/2011 | Budhraja et al. | |
| 8,112,066 B2 | 2/2012 | Ayed | |
| 8,150,740 B1 | 4/2012 | Miller | |
| 8,160,929 B1 | 4/2012 | Park et al. | |
| 8,200,537 B2 | 6/2012 | Pike et al. | |
| 8,266,014 B1 | 9/2012 | Bhosle et al. | |
| 8,266,551 B2 | 9/2012 | Boldyrev et al. | |
| 8,326,698 B1 | 12/2012 | Tam et al. | |
| 8,401,710 B2 | 3/2013 | Budhraja et al. | |
| 8,423,459 B1 | 4/2013 | Green et al. | |
| 8,434,682 B1 | 5/2013 | Argue et al. | |
| 8,498,888 B1 | 7/2013 | Raff et al. | |
| 8,577,810 B1 | 11/2013 | Dalit et al. | |
| 8,602,296 B1 | 12/2013 | Velline et al. | |
| 8,615,439 B2 | 12/2013 | Ramaratnam et al. | |
| 8,630,586 B2 | 1/2014 | Dvortsov et al. | |
| 8,635,113 B2 | 1/2014 | Borders et al. | |
| 8,676,119 B2 | 3/2014 | Cohen et al. | |
| 8,744,919 B1 | 6/2014 | O'Dea | |
| 8,855,312 B1 | 10/2014 | Hodgman et al. | |
| 8,859,337 B2 | 10/2014 | Gaul et al. | |
| 8,892,462 B1 | 11/2014 | Borovsky et al. | |
| 8,972,298 B2 | 3/2015 | Kunz et al. | |
| 9,064,249 B1 | 6/2015 | Borovsky et al. | |
| 9,195,985 B2 | 11/2015 | Domenica et al. | |
| 9,400,640 B2 | 7/2016 | Baratta et al. | |
| 9,542,681 B1 | 1/2017 | Borovsky et al. | |
| 9,652,751 B2 | 5/2017 | Aaron et al. | |
| 9,704,146 B1 | 7/2017 | Morgan et al. | |
| 9,721,251 B1 | 8/2017 | Jen et al. | |
| 9,792,545 B1 | 10/2017 | Sherman et al. | |
| 10,055,779 B1 | 8/2018 | Varma | |
| 10,163,140 B2 * | 12/2018 | Robinson | G06Q 10/08 |
| 10,169,308 B1 | 1/2019 | Mizhen et al. | |
| 10,559,019 B1 | 2/2020 | Beauvais | |
| 2001/0037245 A1 | 11/2001 | Ranganath et al. | |
| 2001/0042024 A1 | 11/2001 | Rogers | |
| 2001/0044751 A1 | 11/2001 | Pugliese et al. | |
| 2001/0049672 A1 | 12/2001 | Moore et al. | |
| 2002/0049622 A1 | 4/2002 | Lettich et al. | |
| 2002/0072983 A1 | 6/2002 | Teller | |
| 2002/0091646 A1 | 7/2002 | Lake et al. | |
| 2002/0095457 A1 | 7/2002 | Sharma et al. | |
| 2002/0138316 A1 | 9/2002 | Katz et al. | |
| 2002/0138317 A1 | 9/2002 | Mok et al. | |
| 2002/0156688 A1 | 10/2002 | Horn et al. | |
| 2003/0014317 A1 * | 1/2003 | Siegel | G06Q 10/087 705/22 |
| 2003/0040976 A1 * | 2/2003 | Adler | G06Q 30/02 705/27.1 |
| 2003/0046173 A1 | 3/2003 | Benjier et al. | |
| 2003/0115285 A1 | 6/2003 | Lee et al. | |
| 2003/0163399 A1 | 8/2003 | Harper et al. | |
| 2003/0204447 A1 | 10/2003 | Dalzell et al. | |
| 2003/0229590 A1 | 12/2003 | Byrne et al. | |
| 2004/0002901 A1 | 1/2004 | Baker et al. | |
| 2004/0019535 A1 | 1/2004 | Perkowski | |
| 2004/0030601 A1 | 2/2004 | Pond et al. | |
| 2004/0078276 A1 | 4/2004 | Shimogori | |
| 2004/0111324 A1 | 6/2004 | Kim | |
| 2004/0128199 A1 | 7/2004 | Cusack | |
| 2004/0153359 A1 | 8/2004 | Ho et al. | |
| 2004/0181454 A1 | 9/2004 | Manno | |
| 2004/0193489 A1 | 9/2004 | Boyd et al. | |
| 2004/0215520 A1 | 10/2004 | Butler et al. | |
| 2005/0055582 A1 | 3/2005 | Bazakos et al. | |
| 2005/0097005 A1 | 5/2005 | Fargo | |
| 2005/0125313 A1 | 6/2005 | Untiedt et al. | |
| 2005/0177463 A1 | 8/2005 | Crutchfield et al. | |
| 2005/0187833 A1 | 8/2005 | Royer et al. | |
| 2005/0246245 A1 | 11/2005 | Satchell et al. | |
| 2005/0261928 A1 | 11/2005 | Skeadas | |
| 2005/0278644 A1 | 12/2005 | Greaves et al. | |
| 2006/0047582 A1 | 3/2006 | Jiang | |
| 2006/0064373 A1 | 3/2006 | Kelley | |
| 2006/0085333 A1 | 4/2006 | Wah et al. | |
| 2006/0149637 A1 | 7/2006 | Zellner et al. | |
| 2006/0173750 A1 | 8/2006 | Naley et al. | |
| 2006/0195563 A1 | 8/2006 | Chapin et al. | |
| 2006/0224467 A1 | 10/2006 | Walker et al. | |
| 2006/0229756 A1 | 10/2006 | Aiso | |
| 2006/0261149 A1 | 11/2006 | Tullur | |
| 2007/0005779 A1 | 1/2007 | Yao et al. | |
| 2007/0043602 A1 | 2/2007 | Ettl et al. | |
| 2007/0069013 A1 | 3/2007 | Seifert et al. | |
| 2007/0073619 A1 | 3/2007 | Smith | |
| 2007/0088615 A1 | 4/2007 | Meng | |
| 2007/0174146 A1 | 7/2007 | Tamarkin et al. | |
| 2007/0175992 A1 | 8/2007 | Brown | |
| 2007/0185785 A1 | 8/2007 | Carlson et al. | |
| 2007/0208930 A1 | 9/2007 | Blank et al. | |
| 2007/0265935 A1 | 11/2007 | Woycik et al. | |
| 2007/0271147 A1 | 11/2007 | Crespo et al. | |
| 2008/0035725 A1 | 2/2008 | Jambunathan et al. | |
| 2008/0037442 A1 | 2/2008 | Bill | |
| 2008/0040265 A1 | 2/2008 | Rackley, III et al. | |
| 2008/0046331 A1 | 2/2008 | Rand | |
| 2008/0133351 A1 | 6/2008 | White et al. | |
| 2008/0162292 A1 | 7/2008 | Roshandel | |
| 2008/0177624 A9 | 7/2008 | Dohse | |
| 2008/0195507 A1 | 8/2008 | Ratnakar | |
| 2008/0197188 A1 | 8/2008 | Jagatic et al. | |
| 2008/0255968 A1 | 10/2008 | Heinrichs | |
| 2008/0262925 A1 | 10/2008 | Kim et al. | |
| 2008/0277465 A1 | 11/2008 | Pletz et al. | |
| 2008/0296978 A1 | 12/2008 | Finkenzeller et al. | |
| 2009/0006114 A1 | 1/2009 | Donovan et al. | |
| 2009/0070228 A1 | 3/2009 | Ronen | |
| 2009/0106138 A1 | 4/2009 | Smith et al. | |
| 2009/0112766 A1 | 4/2009 | Hammad et al. | |
| 2009/0259527 A1 | 10/2009 | Yang et al. | |
| 2009/0271265 A1 | 10/2009 | Lay et al. | |
| 2009/0276293 A1 | 11/2009 | Zellner et al. | |
| 2009/0288012 A1 | 11/2009 | Hertel et al. | |
| 2009/0313132 A1 | 12/2009 | McKenna et al. | |
| 2009/0319421 A1 | 12/2009 | Mathis et al. | |
| 2010/0063906 A1 | 3/2010 | Nelsen et al. | |
| 2010/0076777 A1 | 3/2010 | Paretti et al. | |
| 2010/0082420 A1 | 4/2010 | Trifiletti et al. | |
| 2010/0094729 A1 | 4/2010 | Gray et al. | |
| 2010/0174596 A1 | 7/2010 | Gilman et al. | |
| 2010/0223145 A1 | 9/2010 | Dragt | |
| 2010/0257067 A1 | 10/2010 | Chan | |
| 2010/0269059 A1 | 10/2010 | Othmer et al. | |
| 2011/0004533 A1 | 1/2011 | Soto et al. | |
| 2011/0029416 A1 | 2/2011 | Greenspan | |
| 2011/0040651 A1 | 2/2011 | Swamy et al. | |
| 2011/0047013 A1 | 2/2011 | McKenzie, III | |
| 2011/0054992 A1 | 3/2011 | Liberty et al. | |
| 2011/0055084 A1 | 3/2011 | Singh | |
| 2011/0071892 A1 | 3/2011 | Dickelman | |
| 2011/0087550 A1 | 4/2011 | Fordyce, III et al. | |
| 2011/0125566 A1 | 5/2011 | Mclaughlin et al. | |
| 2011/0145052 A1 | 6/2011 | Lin et al. | |

(56) References Cited

U.S. PATENT DOCUMENTS

| | | |
|---|---|---|
| 2011/0178883 A1 | 7/2011 | Granbery et al. |
| 2011/0180598 A1 | 7/2011 | Morgan et al. |
| 2011/0238512 A1 | 9/2011 | Doty et al. |
| 2011/0251892 A1 | 10/2011 | Laracey |
| 2011/0258014 A1 | 10/2011 | Evangelist et al. |
| 2011/0258689 A1 | 10/2011 | Cohen et al. |
| 2011/0302019 A1 | 12/2011 | Proctor, Jr. et al. |
| 2011/0302080 A1 | 12/2011 | White et al. |
| 2011/0313867 A9 | 12/2011 | Silver |
| 2011/0320345 A1 | 12/2011 | Taveau et al. |
| 2012/0011072 A1 | 1/2012 | Lodolo |
| 2012/0016731 A1 | 1/2012 | Smith et al. |
| 2012/0017082 A1 | 1/2012 | Davies et al. |
| 2012/0029990 A1 | 2/2012 | Fisher |
| 2012/0030044 A1 | 2/2012 | Hurst |
| 2012/0046958 A1 | 2/2012 | Pynadath et al. |
| 2012/0054050 A1 | 3/2012 | Ziegler et al. |
| 2012/0059701 A1 | 3/2012 | van der Veen et al. |
| 2012/0059758 A1 | 3/2012 | Carlson |
| 2012/0084181 A1 | 4/2012 | Miura et al. |
| 2012/0084210 A1 | 4/2012 | Farahmand |
| 2012/0089418 A1 | 4/2012 | Kamath et al. |
| 2012/0095867 A1 | 4/2012 | McKelvey |
| 2012/0095871 A1 | 4/2012 | Dorsey et al. |
| 2012/0095881 A1 | 4/2012 | Rothman |
| 2012/0109777 A1 | 5/2012 | Lipsitz et al. |
| 2012/0110568 A1 | 5/2012 | Abel et al. |
| 2012/0124139 A1 | 5/2012 | Dempski |
| 2012/0150611 A1 | 6/2012 | Isaacson et al. |
| 2012/0150742 A1 | 6/2012 | Poon et al. |
| 2012/0185306 A1 | 7/2012 | Cheng |
| 2012/0209773 A1 | 8/2012 | Ranganathan |
| 2012/0244885 A1 | 9/2012 | Hefetz |
| 2012/0254031 A1 | 10/2012 | Walker et al. |
| 2012/0260199 A1* | 10/2012 | Griffin ............... G06Q 30/0641 715/762 |
| 2012/0271725 A1 | 10/2012 | Cheng |
| 2012/0278727 A1 | 11/2012 | Ananthakrishnan et al. |
| 2012/0284036 A1 | 11/2012 | Evans |
| 2012/0290422 A1 | 11/2012 | Bhinder |
| 2012/0290609 A1 | 11/2012 | Britt |
| 2012/0296679 A1 | 11/2012 | Im |
| 2012/0323685 A1 | 12/2012 | Ullah |
| 2012/0330785 A1 | 12/2012 | Hamick et al. |
| 2013/0006773 A1 | 1/2013 | Lutnick et al. |
| 2013/0024341 A1 | 1/2013 | Jeon et al. |
| 2013/0030889 A1 | 1/2013 | Davich et al. |
| 2013/0048719 A1 | 2/2013 | Bennett |
| 2013/0050080 A1 | 2/2013 | Dahl et al. |
| 2013/0054320 A1 | 2/2013 | Dorso et al. |
| 2013/0054336 A1 | 2/2013 | Graylin |
| 2013/0065672 A1 | 3/2013 | Gelman et al. |
| 2013/0066753 A1 | 3/2013 | Doyle et al. |
| 2013/0066783 A1 | 3/2013 | Wolff |
| 2013/0073363 A1 | 3/2013 | Boal |
| 2013/0103574 A1 | 4/2013 | Conrad et al. |
| 2013/0103946 A1 | 4/2013 | Binenstock |
| 2013/0110656 A1 | 5/2013 | Chau et al. |
| 2013/0117329 A1 | 5/2013 | Bank et al. |
| 2013/0124333 A1 | 5/2013 | Doughty et al. |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0151381 A1 | 6/2013 | Klein |
| 2013/0151613 A1 | 6/2013 | Dhawan et al. |
| 2013/0159172 A1 | 6/2013 | Kim |
| 2013/0159446 A1 | 6/2013 | Carlson et al. |
| 2013/0166402 A1 | 6/2013 | Parento et al. |
| 2013/0179227 A1 | 7/2013 | Booth et al. |
| 2013/0198018 A1 | 8/2013 | Baig |
| 2013/0198032 A1 | 8/2013 | Wallace et al. |
| 2013/0204727 A1 | 8/2013 | Rothschild |
| 2013/0218721 A1 | 8/2013 | Borhan et al. |
| 2013/0225081 A1 | 8/2013 | Doss et al. |
| 2013/0226734 A1 | 8/2013 | Raman |
| 2013/0236109 A1 | 9/2013 | Madden et al. |
| 2013/0238382 A1 | 9/2013 | Schierholt et al. |
| 2013/0246207 A1 | 9/2013 | Novak et al. |
| 2013/0246280 A1 | 9/2013 | Kirsch |
| 2013/0246301 A1 | 9/2013 | Radhakrishnan et al. |
| 2013/0262206 A1 | 10/2013 | Janes |
| 2013/0268431 A1 | 10/2013 | Mohsenzadeh |
| 2013/0275237 A1 | 10/2013 | Ramaratnam et al. |
| 2013/0282466 A1 | 10/2013 | Hampton |
| 2013/0290149 A1 | 10/2013 | Rashwan |
| 2013/0290173 A1 | 10/2013 | Nemeroff |
| 2013/0290203 A1 | 10/2013 | Purves et al. |
| 2013/0290522 A1 | 10/2013 | Behm, Jr. |
| 2013/0291018 A1 | 10/2013 | Billings et al. |
| 2013/0297933 A1 | 11/2013 | Fiducia et al. |
| 2013/0317835 A1 | 11/2013 | Mathew |
| 2013/0317950 A1 | 11/2013 | Abraham et al. |
| 2013/0325612 A1 | 12/2013 | Sommerville et al. |
| 2013/0332385 A1 | 12/2013 | Kilroy et al. |
| 2013/0339199 A1 | 12/2013 | Patt et al. |
| 2013/0346221 A1 | 12/2013 | Rangachari et al. |
| 2013/0346223 A1 | 12/2013 | Prabhu et al. |
| 2013/0346329 A1 | 12/2013 | Alib-bulatao et al. |
| 2014/0012754 A1 | 1/2014 | Hanson et al. |
| 2014/0019236 A1 | 1/2014 | Argue et al. |
| 2014/0019248 A1 | 1/2014 | Stoliartchouk et al. |
| 2014/0019266 A1 | 1/2014 | Stoliartchouk et al. |
| 2014/0019274 A1 | 1/2014 | Hardin et al. |
| 2014/0019365 A1 | 1/2014 | Fallows et al. |
| 2014/0025446 A1 | 1/2014 | Nagarajan et al. |
| 2014/0032392 A1 | 1/2014 | Ansari |
| 2014/0057667 A1 | 2/2014 | Blankenship et al. |
| 2014/0058861 A1 | 2/2014 | Argue et al. |
| 2014/0081853 A1 | 3/2014 | Sanchez et al. |
| 2014/0081854 A1 | 3/2014 | Sanchez et al. |
| 2014/0096179 A1 | 4/2014 | Ben-Shalom et al. |
| 2014/0099888 A1 | 4/2014 | Flanagan et al. |
| 2014/0108245 A1 | 4/2014 | Drummond et al. |
| 2014/0114781 A1 | 4/2014 | Watanabe |
| 2014/0122345 A1 | 5/2014 | Argue et al. |
| 2014/0129135 A1 | 5/2014 | Holden et al. |
| 2014/0129302 A1 | 5/2014 | Amin et al. |
| 2014/0129357 A1 | 5/2014 | Goodwin |
| 2014/0129951 A1 | 5/2014 | Amin et al. |
| 2014/0136318 A1 | 5/2014 | Alberth, Jr. et al. |
| 2014/0156508 A1 | 6/2014 | Argue et al. |
| 2014/0164280 A1* | 6/2014 | Stepanenko ........ G06Q 30/0601 705/341 |
| 2014/0180805 A1 | 6/2014 | Argue et al. |
| 2014/0184505 A1 | 7/2014 | Fullerton et al. |
| 2014/0188601 A1 | 7/2014 | Buset et al. |
| 2014/0201367 A1 | 7/2014 | Trummer et al. |
| 2014/0207669 A1 | 7/2014 | Rosenberg |
| 2014/0229331 A1 | 8/2014 | Mcintosh et al. |
| 2014/0236762 A1 | 8/2014 | Gerber et al. |
| 2014/0244416 A1 | 8/2014 | Venkat et al. |
| 2014/0249947 A1 | 9/2014 | Hicks et al. |
| 2014/0254820 A1 | 9/2014 | Gardenfors et al. |
| 2014/0257958 A1 | 9/2014 | Andrews |
| 2014/0278589 A1 | 9/2014 | Rados et al. |
| 2014/0279184 A1 | 9/2014 | Lai et al. |
| 2014/0279187 A1 | 9/2014 | Gopinath et al. |
| 2014/0279294 A1 | 9/2014 | Field-darragh et al. |
| 2014/0324989 A1 | 10/2014 | Zhang |
| 2014/0337134 A1 | 11/2014 | Bugenhagen |
| 2014/0372220 A1 | 12/2014 | Peterson et al. |
| 2014/0379497 A1 | 12/2014 | Varma et al. |
| 2014/0379536 A1 | 12/2014 | Varma et al. |
| 2014/0379580 A1 | 12/2014 | Varma et al. |
| 2015/0012394 A1 | 1/2015 | Rossi et al. |
| 2015/0025983 A1 | 1/2015 | Cicerchi |
| 2015/0046271 A1 | 2/2015 | Scholl et al. |
| 2015/0066799 A1 | 3/2015 | Scipioni |
| 2015/0112838 A1 | 4/2015 | Li et al. |
| 2015/0134439 A1 | 5/2015 | Maxwell et al. |
| 2015/0142611 A1 | 5/2015 | Kaplan et al. |
| 2015/0187021 A1 | 7/2015 | Moring et al. |
| 2015/0199668 A1 | 7/2015 | Fernando et al. |

(56) References Cited

U.S. PATENT DOCUMENTS

| | | | |
|---|---|---|---|
| 2015/0294312 | A1 | 10/2015 | Kendrick et al. |
| 2015/0332223 | A1 | 11/2015 | Aaron et al. |
| 2016/0019573 | A1 | 1/2016 | Grover |
| 2016/0019628 | A1 | 1/2016 | Udumudi et al. |
| 2017/0270574 | A1 | 9/2017 | Hessurg |
| 2019/0147446 | A1 | 5/2019 | Varma et al. |
| 2019/0318337 | A1 | 10/2019 | Schulz et al. |
| 2020/0082459 | A1 | 3/2020 | Varma et al. |
| 2020/0219102 | A1 | 7/2020 | Varma et al. |
| 2021/0279728 | A1 | 9/2021 | Varma et al. |

FOREIGN PATENT DOCUMENTS

| | | | |
|---|---|---|---|
| CA | 2 916 603 | A1 | 12/2014 |
| CA | 2 930 186 | A1 | 5/2015 |
| GB | 2530451 | A | 3/2016 |
| KR | 100426388 | B1 | 4/2004 |
| KR | 10-2006-0103089 | A | 9/2006 |
| WO | 01/71617 | A1 | 9/2001 |
| WO | 2009/132339 | A2 | 10/2009 |
| WO | 2014/210020 | A1 | 12/2014 |
| WO | 2015/069389 | A1 | 5/2015 |
| WO | 2015/100378 | A1 | 7/2015 |
| WO | 2015/179316 | A1 | 11/2015 |

OTHER PUBLICATIONS

Price, Mar. 2012, "PayPal Takes On Square, Launches 'PayPal Here' Credit Card Reader", https://mashable.com/2012/03/15/paypal-takes-on-square-launches-paypal-here-credit-card-reader/(Year: 2012).*
Non-Final Office Action dated Jul. 14, 2016, for U.S. Appl. No. 14/160,490, of Moring, D., filed Jan. 21, 2014.
Non-Final Office Action dated Jul. 21, 2016, for U.S. Appl. No. 14/329,638, of Aaron, P., et al., filed Jul. 11, 2014.
Non-Final Office Action dated Aug. 10, 2016, for U.S. Appl. No. 14/312,433, of Varma, A.K., et al., filed Jun. 23, 2014.
Final Office Action dated Sep. 1, 2016, for U.S. Appl. No. 14/062,617, of Templeton, T., et al., filed Oct. 24, 2013.
Non-Final Office Action dated Sep. 8, 2016, for U.S. Appl. No. 14/312,371, of Varma, A.K., et al., filed Jun. 23, 2014.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 13/829,658, of Morgan, T.B., et al., filed Mar. 14, 2013.
Non-Final Office Action dated Sep. 22, 2016, for U.S. Appl. No. 14/182,655, of Spindel, N., et al., filed Feb. 18, 2014.
Examination Report No. 1 for Australian Patent Application No. 2014302661, dated Sep. 27, 2016.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Final Office Action dated Nov. 1, 2016, for U.S. Appl. No. 14/160,490, of Moring, D., et al., filed Jan. 21, 2014.
Final Office Action dated Nov. 10, 2016, for U.S. Appl. No. 13/830,350, of Morgan, T.B., et al., filed Mar. 14, 2013.
Non-Final Office Action dated Nov. 17, 2016, for U.S. Appl. No. 14/701,571, of Jen, M., et al., filed May 1, 2015.
Advisory Action dated Nov. 28, 2016, for U.S. Appl. No. 14/062,617, of Templeton, T., et al., filed Oct. 24, 2013.
Final Office Action dated Nov. 28, 2016, for U.S. Appl. No. 14/312,397, of Varma, A.K., et al., filed Jun. 23, 2014.
Final Office Action dated Nov. 29, 2016, for U.S. Appl. No. 14/088,113, of Maxwell, D.W., et al., filed Nov. 22, 2013.
Final Office Action dated Dec. 12, 2016, for U.S. Appl. No. 14/088,141, of Maxwell, D.W., et al., filed Nov. 22, 2013.
Examination Report No. 1 for Australian Patent Application No. 2014347192, dated Dec. 15, 2016.
Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examiner's Requisition for Canadian Patent Application No. 2,930,186, dated Jan. 30, 2017.
Examiner's Requisition for Canadian Patent Application No. 2,916,603, dated Feb. 9, 2017.
Notice of Acceptance for Australian Patent Application No. 2014347192, dated Feb. 16, 2017.
Corrected Notice of Allowance dated Feb. 27, 2017, for U.S. Appl. No. 14/329,658, of Aaron, P., et al., filed Jul. 11, 2014.
Notice of Allowance dated Mar. 2, 2017, for U.S. Appl. No. 13/829,080, of Morgan, T.B., et al., filed Mar. 14, 2013.
Non-Final Office Action dated Mar. 15, 2017, for U.S. Appl. No. 13/829,658, of Morgan, T.B., et al., filed Mar. 14, 2013.
Notice of Allowance dated Mar. 23, 2017, for U.S. Appl. No. 14/701,571, of Jen, M., et al., filed May 1, 2015.
Advisory Action dated Apr. 10, 2017, for U.S. Appl. No. 14/312,397, of Varma, A.K., et al., filed Jun. 23, 2014.
Non-Final Office Action dated Apr. 18, 2017, for U.S. Appl. No. 14/160,490, of Moring, D., et al., filed Jan. 21, 2014.
Final Office Action dated Apr. 19, 2017, for U.S. Appl. No. 14/312,433, of Varma, A.K., et al., filed Jun. 23, 2014.
Final Office Action dated Apr. 27, 2017, for U.S. Appl. No. 14/312,371, of Varma, A.K., et al., filed Jun. 23, 2014.
Non-Final Office Action dated Jun. 19, 2017, for U.S. Appl. No. 14/730,860, of Sasmaz, Y., et al., filed Jun. 4, 2015.
Advisory Action dated Jun. 30, 2017, for U.S. Appl. No. 14/312,433, of Varma, A.K., et al., filed Jun. 23, 2014.
Non-Final Office Action dated Jul. 10, 2017, for U.S. Appl. No. 13/830,350, of Morgan, T.B., et al., filed Mar. 14, 2013.
Advisory Action dated Jul. 11, 2017, for U.S. Appl. No. 14/312,371, of Varma, A.K., et al., filed Jun. 23, 2014.
Examination Report No. 1 for Australian Patent Application No. 2015264426, dated Jul. 11, 2017.
International Search Report and Written Opinion for International Application No. PCT/US2014/043891, dated Dec. 10, 2014.
International Search Report and Written Opinion for International Application No. PCT/US2014/058398, dated Dec. 24, 2014.
International Search Report and Written Opinion for International Application No. PCT/US2014/072269, dated Mar. 31, 2015.
International Search Report and Written Opinion for International Application No. PCT/US2015/031423, dated Aug. 13, 2015.
Authors et al.: Disclosed Anonymously, "Tying in Store Discounts to Social Media Posts," IP.com, published on Oct. 14, 2011, pp. 1-3.
"CDS Assists Polk Audio in Going Direct-to-Consumer with I-Sonic Entertainment System," Business Wire, published Sep. 6, 2006, pp. 1-3.
Non-Final Office Action dated Apr. 10, 2017, for U.S. Appl. No. 14/501,332, of Varma, A.K., filed Sep. 30, 2014.
Non-Final Office Action dated Jun. 6, 2017, for U.S. Appl. No. 14/501,285, of Varma, A.K., filed Sep. 30, 2014.
Final Office Action dated Nov. 15, 2017, for U.S. Appl. No. 14/501,332, of Varma, A.K., filed Sep. 30, 2014.
Final Office Action dated Dec. 15, 2017, for U.S. Appl. No. 14/501,285, of Varma, A.K., filed Sep. 30, 2014.
Advisory Action dated Feb. 2, 2018, for U.S. Appl. No. 14/501,332, of Varma, A.K., filed Sep. 30, 2014.
Non-Final Office Action dated Mar. 8, 2018, for U.S. Appl. No. 14/312,433, of Varma, A.K., et al., filed Jun. 23, 2014.
Advisory Action dated Mar. 8, 2018, for U.S. Appl. No. 14/501,285, of Varma, A.K., filed Sep. 30, 2014.
Notice of Allowance dated Apr. 17, 2018, for U.S. Appl. No. 14/501,285, of Varma, A.K., filed Sep. 30, 2014.
Non-Final Office Action dated Apr. 26, 2018, for U.S. Appl. No. 14/501,332, of Varma, A.K., filed Sep. 30, 2014.
Notice of Allowance dated Sep. 11, 2018, for U.S. Appl. No. 14/312,397, of Varma, A.K., et al., filed Jun. 23, 2014.
Examination Report No. 1 for Australian Patent Application No. 2017235924, dated Sep. 13, 2018.
Notice of Allowance dated Nov. 1, 2018, for U.S. Appl. No. 14/312,433, of Varma, A.K., et al., filed Jun. 23, 2014.
Final Office Action dated Nov. 2, 2018, for U.S. Appl. No. 14/501,332, of Varma, A.K., filed Sep. 30, 2014.

(56) References Cited

OTHER PUBLICATIONS

Advisory Action dated Jan. 25, 2019, for U.S. Appl. No. 14/501,332, of Varma, A.K., filed Sep. 30, 2014.
Examiner Requisition for Canadian Patent Application No. 2,916,603, dated Feb. 1, 2019.
Advisory Action dated Feb. 13, 2019, for U.S. Appl. No. 14/501,332, of Varma, A.K., filed Sep. 30, 2014.
Non-Final Office Action dated Mar. 26, 2019, for U.S. Appl. No. 14/501,332, of Varma, A.K., filed Sep. 30, 2014.
Examination Report No. 2 for Australian Patent Application No. 2017235924, dated Apr. 24, 2019.
Munson, J., and Gupta, V.K., "Location-Based Notification as a General-Purpose Service," dated Sep. 28, 2002, Retrieved from the Internet URL- https://ai2-s2-pdfs.s3.amazonaws.com/1bb5/6ae0a70b030e2f2376ed246834bddcabd27b.pdf, pp. 40-44.
Final Office Action dated Aug. 10, 2017, for U.S. Appl. No. 14/160,490, of Moring, D., et al., filed Jan. 21, 2014.
Final Office Action dated Sep. 15, 2017, for U.S. Appl. No. 14/182,655, of Spindel, N., et al., filed Feb. 18, 2014.
Examination Report No. 2 for Australian Patent Application No. 2014302661, dated Sep. 26, 2017.
Advisory Action dated Oct. 31, 2017, for U.S. Appl. No. 14/160,490, of Moring, D., et al., filed Jan. 21, 2014.
Final Office Action dated Nov. 17, 2017, for U.S. Appl. No. 14/730,860, of Sasmaz, Y., et al., filed Jun. 4, 2015.
Notice of Allowance dated Nov. 24, 2017, for U.S. Appl. No. 13/829,658, of Morgan, T.B., et al., filed Mar. 14, 2013.
Non-Final Office Action dated Dec. 13, 2017, for U.S. Appl. No. 14/312,397, of Varma, A.K., et al., filed Jun. 23, 2014.
Non-Final Office Action dated Dec. 29, 2017, for U.S. Appl. No. 14/165,256, of Aaron, P., filed Jan. 27, 2014.
Examiner's Requisition for Canadian Patent Application No. 2,930,186, dated Jan. 11, 2018.
Final Office Action dated Jan. 22, 2018, for U.S. Appl. No. 13/830,350, of Morgan, T.B., et al., filed Mar. 14, 2013.
Examiner's Requisition for Canadian Patent Application No. 2,916,603, dated Feb. 15, 2018.
"Another eBay Band-Aid Fails to Fix the New Pricing Structure Flaws," posted on Oct. 18, 2008, Retrieved from the Internet URL: https://thebrewsnews.wordpress.com/2008/10/18/another-ebay-band-aid-fails-to-fix-the-new-pricing-structure-flaws/, pp. 1-4.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Merchantindustry.com-Best Merchant Services," Retrieved from internet URL: https://web.archive.org/web/20121020212419/http://www.merchantindustry.com/, on Dec. 30, 2015, pp. 1-7.
"Online Shopping," dated Nov. 2, 2014, Retrieved from the Internet URL: http://en.wikipedia.org/wiki/Online_shopping, on Nov. 10, 2014, pp. 1-12.
"Payment Gateway," Wikipedia, published May 30, 2014, Retrieved from the Internet URL: http://en.wikipedia.org/wiki/Pavment gateways, on Jun. 6, 2014, pp. 1-3.
"ProPay JAK Mobile Card Reader," Propay, published Dec. 27, 2011, Retrieved from the Internet URL: https://web.archive.org/web/20111227055421/https://www.propay.com/products-services/accept-payments/jak-card-reader, pp. 1-2.
"Tracking Inventory," PayPal, dated Jan. 4, 2010, Retrieved from the Internet URL: https://www.paypal-community.com/t5/How-to-use-PayPal-Archive/Tracking-inventory/td-p/19392, pp. 1-3.
"Verified by Visa Acquirer and Merchant Implementation Guide," U.S. Region, Visa Public, May 2011, pp. 1-114.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
Punch, L., "E-commerce: Just what does card-present mean these days," dated Oct. 1, 2012, Retrieved from the Internet URL: http://digitaltransactions.net/news/ story/ E-Commerce_-Just-What-Does-Card-Present-Mean-These-Days, on Feb. 17, 2015, pp. 1-4.
Shalmanese, "The Straight Dope Message Board," message dated Oct. 5, 2013, Retrieved from the Internet URL: http://boards.straightdope.com/sdmb/showthread.php?t=703989%BB, on Jul. 18, 2016, pp. 1-10.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
Non-Final Office Action dated Apr. 10, 2014, for U.S. Appl. No. 14/160,490, of Moring, D., et al., filed Jan. 21, 2014.
Non-Final Office Action dated May 29, 2014, for U.S. Appl. No. 13/837,562, of Chin, H.C.A., et al., filed Mar. 15, 2013.
Non-Final Office Action dated Aug. 27, 2014, for U.S. Appl. No. 14/165,256, of Aaron, P., filed Jan. 27, 2014.
Final Office Action dated Aug. 28, 2014, for U.S. Appl. No. 14/160,490, of Moring, D., et al., filed Jan. 21, 2014.
Advisory Action dated Nov. 18, 2014, for U.S. Appl. No. 14/160,490, of Moring, D., et al., filed Jan. 21, 2014.
Non-Final Office Action dated Dec. 1, 2014, for U.S. Appl. No. 14/062,617, of Templeton, T., et al., filed Oct. 24, 2013.
Non Final Office Action dated Dec. 15, 2014, for U.S. Appl. No. 14/312,397, of Varma, A.K., et al., filed Jun. 23, 2014.
Final Office Action dated Jan. 26, 2015, for U.S. Appl. No. 13/837,562, of Chin, H.C.A., et al., filed Mar. 15, 2013.
Notice of Allowance dated Feb. 20, 2015, for U.S. Appl. No. 14/513,076, of Borovsky, A., et al., filed Oct. 13, 2014.
Final Office Action dated Mar. 17, 2015, for U.S. Appl. No. 14/165,256, of Aaron, P., filed Jan. 27, 2014.
Non-Final Office Action dated Mar. 19, 2015, for U.S. Appl. No. 14/329,638, of Aaron, P., et al., filed Jul. 11, 2014.
Final Office Action dated Apr. 16, 2015, for U.S. Appl. No. 14/062,617, of Templeton, T., et al., filed Oct. 24, 2013.
Non-Final Office Action dated May 20, 2015, for U.S. Appl. No. 13/829,080, of Morgan, T.B., et al., filed Mar. 14, 2013.
Non-Final Office Action dated Jun. 11, 2015, for U.S. Appl. No. 14/692,655, of Borovsky, A., et al., filed Apr. 21, 2015.
Final Office Action dated Aug. 31, 2015, for U.S. Appl. No. 14/312,397, of Varma, A.K., et al., filed Jun. 23, 2014.
Final Office Action dated Sep. 17, 2015, for U.S. Appl. No. 13/829,080, of Morgan, T.B., et al., filed Mar. 14, 2013.
Non-Final Office Action dated Oct. 5, 2015, for U.S. Appl. No. 13/829,658, of Morgan, T.B., et al., filed Mar. 14, 2013.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/165,256, of Aaron, P., filed Jan. 27, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al. filed Jul. 11, 2014.
Non-Final Office Action dated Nov. 18, 2015, for U.S. Appl. No. 14/182,655, of Spindel, N., et al., filed Feb. 18, 2014.
Advisory Action dated Nov. 24, 2015, for U.S. Appl. No. 13/829,080, of Morgan, T.B., et al., filed Mar. 14, 2013.
Advisory dated dated Dec. 30, 2015, for U.S. Appl. No. 14/692,655, of Borovsky, A., et al., filed Apr. 21, 2015.
Non-Final Office Action dated Jan. 14, 2016, for U.S. Appl. No. 14/312,397, of Varma, A.K., et al., filed Jun. 23, 2014.
Non-Final Office Action dated Feb. 2, 2016, for U.S. Appl. No. 13/829,080, of Morgan, T.B., et al., filed Mar. 14, 2013.
Non-Final Office Action dated Feb. 23, 2016, for U.S. Appl. No. 14/062,617, of Templeton, T., et al., filed Oct. 24, 2013.
Non-Final Office Action dated Mar. 14, 2016, for U.S. Appl. No. 14/692,655, of Borovsky, A., et al., filed Apr. 21, 2015.

(56) References Cited

OTHER PUBLICATIONS

Final Office Action dated Apr. 13, 2016, for U.S. Appl. No. 14/165,256, of Aaron, P., filed Jan. 27, 2014.
Final Office Action dated Apr. 27, 2016, for U.S. Appl. No. 14/182,655, of Spindel, N., et al., filed Feb. 18, 2014.
Non-Final Office Action dated May 3, 2016, for U.S. Appl. No. 13/830,350, of Morgan, T.B., et al., filed Mar. 14, 2013.
Non-Final Office Action dated May 5, 2016, for U.S. Appl. No. 14/312,397, of Varma, A.K., et al., filed Jun. 23, 2014.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D.W., et al., filed Nov. 22, 2013.
Non-Final Office Action dated Jun. 8, 2016, for U.S. Appl. No. 14/088,141, of Maxwell, D.W., et al., filed Nov. 22, 2013.
Final Office Action dated Jun. 20, 2016, for U.S. Appl. No. 13/829,658, of Morgan, T.B., et al., filed Mar. 14, 2013.
Final Office Action dated Aug. 7, 2019, for U.S. Appl. No. 14/501,332, of Varma, A.K., filed Sep. 30, 2014.
Examination Report No. 3 for Australian Patent Application No. 2017235924, dated Aug. 15, 2019, 3 pages.
Examination Report No. 4 for Australian Patent Application No. 2017235924, dated Sep. 10, 2019, 3 pages.
Authors et al.: "Automatic Management of On-Line Inventory for Enhancing Commerce Opportunities," IP.com No. IPCOM000177329D, IP.com, Electronic Publication Date on Dec. 9, 2008, pp. 1-7.
C. Steinfield et al., "Integrating brick and mortar locations with e-commerce: understanding synergy opportunities," Proceedings of the 35th Annual Hawaii International Conference on System Sciences, Big Island, HI, 2002, pp. 2920-2929.
William Aspray., and Paul E. Ceruzzi., "Discovering a Role Online: Brick-and-Mortar Retailers and the Internet," in The Internet and American Business, MITP, 2008, pp. 233-258.
https://web.archive.org/web/20130513203402/http://www.ncr.com/products/small-business/ncr-silver (Year: 2013).
Non-Final Office Action dated Dec. 26, 2019, for U.S. Appl. No. 16/683,802 of Varma, A.K., filed Nov. 14, 2019.
Non-Final Office Action dated Mar. 6, 2020, for U.S. Appl. No. 16/246,960, of Varma, A.K., filed Jan. 14, 2019.
Examiner Requisition for Canadian Patent Application No. 2,916,603, dated Jan. 23, 2020.
Final Office Action dated Apr. 14, 2020, for U.S. Appl. No. 16/683,802 of Varma, A.K., filed Nov. 14, 2019.
Non-Final Office Action dated Apr. 22, 2020, for U.S. Appl. No. 16/820,230, of Varma, A.K., filed Mar. 16, 2020.
Examination Report for GB Patent Application No. 1522602.0, dated Mar. 27, 2020.
Advisory Action dated Aug. 17, 2020, for U.S. Appl. No. 16/683,802 of Varma, A.K., filed Nov. 14, 2019.
"E-Commerce Intergration," posted on Mar. 7, 2013, Retrieved from the Internet URL: http://www.amberpos.com/pint-of-sale/ecommerce-integration/, pp. 1-6.
Notice of Allowance dated Aug. 25, 2020, for U.S. Appl. No. 16/246,960, of Varma, A.K, filed Jan. 14, 2019.
Non-Final Action dated Aug. 26, 2020, for U.S. Appl. No. 16/683,802 of Varma, A.K., filed Nov. 14, 2019.
Final Office Action dated Sep. 22, 2020, for U.S. Appl. No. 16/820,230, of Varma, A.K., filed Mar. 16, 2020.
Examination Report for GB Patent Application No. 1522602.0, dated Sep. 28, 2020.
Kourouthanassis, P., and Roussos, G., "Developing consumer-friendly pervasive retail systems", IEEE Pervasive Computing, doi: 10.1109/MPRV.2003.1203751, vol. 2, No. 2, pp. 32-39 (Apr.-Jun. 2003).
Turow, J., "The Customized Store," Niche Envy: Marketing Discrimination in the Digital Age, MIT Press, pp. 125-147 (Year: 2008).
Notice of Allowance dated Jan. 22, 2021, for U.S. Appl. No. 16/820,230, of Varma, A.K., filed Mar. 16, 2020.
Final Action dated Mar. 16, 2021, for U.S. Appl. No. 16/683,802 of Varma, A.K., filed Nov. 14, 2019.
Examiner Requisition for Canadian Patent Application No. 2,916,603, dated Jan. 22, 2021.
Examination Report No. 3 for Australian Patent Application No. 2019229446, dated Jul. 26, 2021, 3 pages.
Examination Report No. 1 for Australian Patent Application No. 2019229446, dated Nov. 21, 2020, 6 pages.
Mahar, S., "Using online pickup site inclusion policies to manage demand in retail/E-tail organizations", Computers & Operations Research, vol. 39, Issue 5, pp. 991-999 (2012).
Notice of Allowance dated May 25, 2021, for U.S. Appl. No. 16/683,802 of Varma, A K., filed Nov. 14, 2019.
Examination Report No. 2 for Australian Patent Application No. 2019229446, dated May 5, 2021, 4 pages.
Examiner Requisition for Canadian Patent Application No. 2,916,603, dated Sep. 17, 2021.
Examination Report No. 4 for Australian Patent Application No. 2019229446, dated Oct. 27, 2021.
Examination Report No. 5 for Australian Patent Application No. 2019229446, dated Nov. 22, 2021.

\* cited by examiner

GENERATING AN ONLINE STOREFRONT

RELATED APPLICATION

This patent application is a continuation application of, and claims priority to, commonly-owned U.S. patent application Ser. No. 13/829,080, entitled "GENERATING AN ONLINE STOREFRONT," filed on Mar. 14, 2013, and granted as U.S. Pat. No. 9,704,146 on Jul. 11, 2017, which is incorporated herein by reference in its entirety.

TECHNICAL FIELD

This disclosure relates to generating an online storefront for merchants.

BACKGROUND

A merchant operating a brick and mortar store can service customers using a point of sale (POS) system. The POS system can include a physical electronic cash register or dedicated POS hardware. When customers want to purchase items for sale from the store, the merchant uses the POS system to record and complete the transaction. The POS system can also manage inventory for the store, e.g., track quantities of items for sale.

In a conventional point-of-sale electronic credit card transaction, the transaction is authorized and captured over a network connection. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture stage can trigger the financial transaction between the card issuer and the merchant, and optionally creates a receipt. There can also be other entities, e.g., the card acquirer, in the route of the transaction. Debit card transactions have a different routing, but also require swiping of the card.

Occasionally, the merchant chooses to operate an online ecommerce store in addition to the brick and mortar store. The merchant can create a commerce web site and manually enter inventory data from the brick and mortar store. The merchant can program the web site to process online payment transactions.

SUMMARY

A merchant can operate a brick and mortar store through a point of sale system. The point of sale system provides an interface for the merchant to manage inventory, e.g., add, modify, or remove items for sale. The interface can provide an option to generate an online storefront based on the existing inventory data through a single action, e.g., checking a box. For example, the merchant can check a button that causes the point of sale system to generate an online storefront. Customers can conduct transactions from the online storefront, and the merchant can be notified of the transactions through the point of sale system.

In one aspect, a method of generating a storefront for a merchant, comprising: receiving a single indication to generate an online storefront for a point of sale system of the merchant, where the point of sale system includes inventory data of a plurality of items for sale; identifying the plurality of items for sale from the inventory data from point of sale system; and generating one or more resources for each item of the plurality of items for sale, where the one or more resources include details of the item, where the details are obtained from the inventory data, where the one or more resources are accessible from a web domain.

Implementations can include one or more of the following features. The details of the item include one or more of the following: a price, a description, a quantity, or a title. The one or more resources include executable instructions that enable the customer to interact with the item through the web domain. The executable instructions enable the customer to reserve or purchase the item. The instructions, when executed on a device, comprise the following operations: receiving user input at the device from the customer, where the user input selects one or more items for sale, and where the user input includes payment information for the one or more items; submitting, to a payment processing system, a request for a transaction that includes the payment information; receiving an authentication of the transaction from the payment processing system; and in response to receiving the authentication, presenting an indication of the authentication on a display of the device. Upon receiving the authentication, the inventory data at the point of sale system is updated. In response to receiving the authentication, further comprising: determining, at the payment processing system, an address of the customer; and processing, at the payment processing system, the transaction based on the address. Processing the transaction based on the address comprises sending the address to a third party fulfillment service, which sends the one or more items to the address. In response to receiving the authentication, further comprising: determining a quantity of the one or more items is under a limit in the inventory data of the point of sale system; notifying the merchant of the determination. The instructions, when executed, display an option for the item to be picked up in store or to be delivered. The single indication is received through a selected button that is displayed on a user interface, where the user interface is running on a device of the customer or the merchant. The instructions, when executed, display suggestions for popular inventory based on transactions with the point of sale system.

Advantages may include one or more of the following. A merchant can create an online storefront based on existing inventory data with a single action. The online storefront can provide a complete checkout process for each item in the inventory data. The merchant can sell to online customers as well as customers in the brick and mortar store, which can create a new revenue stream. Inventory data can be synchronized across both the online storefront and the brick and mortar store. Therefore, the merchant does not have to separately maintain inventory data for the online storefront and the brick and mortar store.

BRIEF DESCRIPTION OF THE DRAWINGS

Like reference numbers and designations in the various drawings indicate like elements.

DETAILED DESCRIPTION

Figure 1:
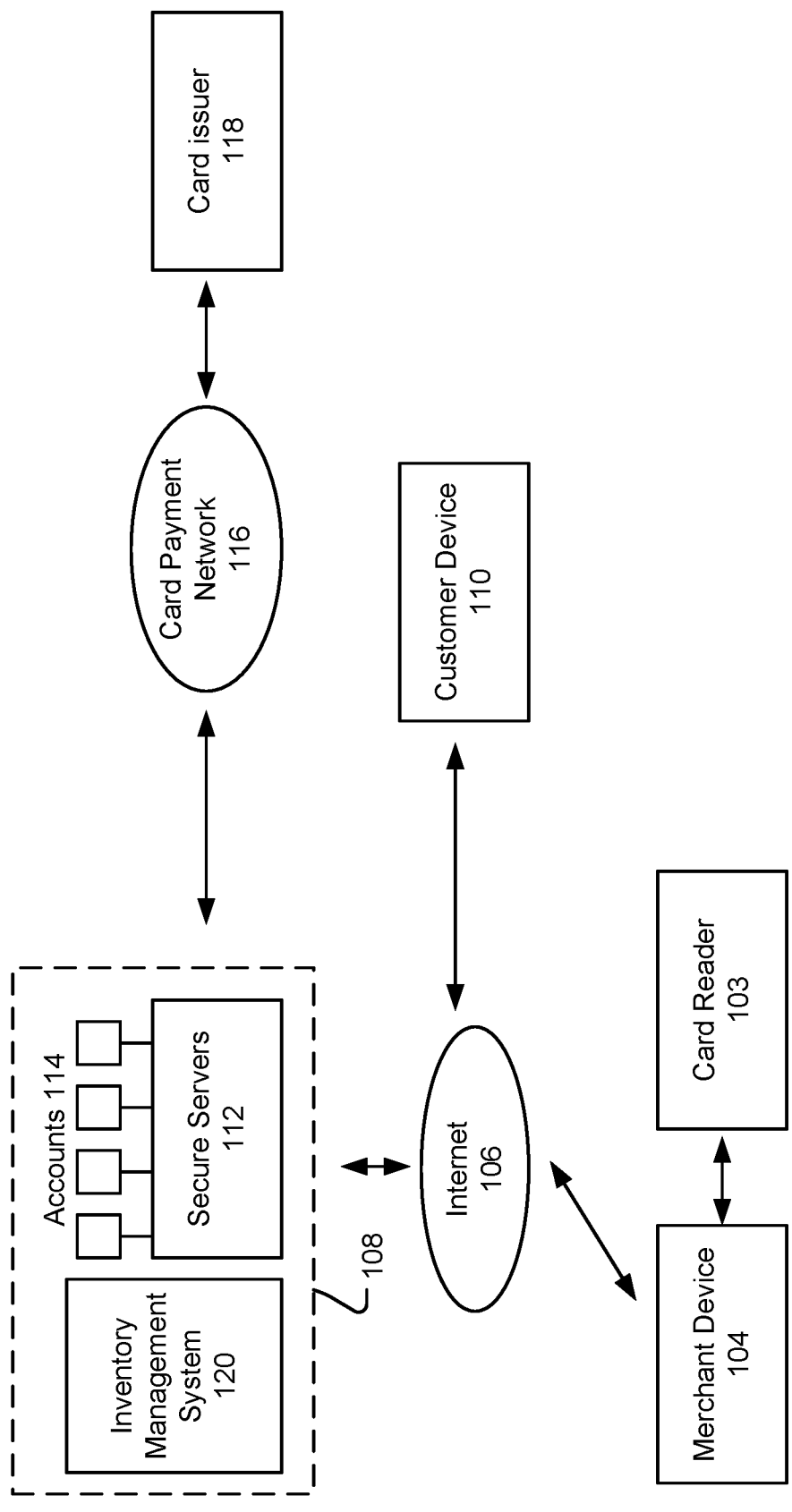
FIG. 1 is a schematic illustration of an example payment system architecture of a point of sale system.

FIG. 1 is a schematic illustration of the architecture of an example point of sale system 100. The overall system 100 includes a merchant device 104, e.g., a mobile device or a point of sale system, connected to a network, e.g., the Internet 106. The mobile device is a mobile computing device, i.e., a hand-held computing device, capable of running a customer or a merchant application. For example, the mobile device can be a smartphone, tablet, a desktop computer, a laptop computer, dedicated point of sale hardware, or other data processing apparatus.

A payment processor operates a payment service system 108. The payment processor processes transactions conducted at the merchant device 104. The merchant device 104 can receive card information, e.g., through a card swipe, for the transaction at a card reader 103. The merchant device 104 communicates with the payment service system 108 using the network 106. The payment service system 108 includes one or more servers 112, at least some of which can handle secure transactions (e.g., using a secure server), to process all transactions with the merchant device 104. In general, servers 112 can store public merchant information such as the merchant's address or phone number. The servers 112 also handle secure information such as credit card numbers, debit card numbers, bank accounts, user accounts, user identifying information or other sensitive information.

The payment service system 108 can communicate with a computer system 116 of a card payment network, e.g., Visa or MasterCard. The payment service system 108 can communicate with a computer system 116 over the same network 106 used to communicate with the mobile device 104, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Eventually, in order to receive funds from the transaction, the merchant will need to enter financial account information into the payment service system sufficient to receive funds. For example, in the case of a bank account, the merchant can enter the bank account number and routing number. The merchant's financial account can also be associated with a credit card account or another third party financial account. In addition, in some implementations, if the merchant has not entered the financial account information, the payment service system 108 can hold the received funds until the financial account information is provided.

Although FIG. 1 describes communicating with a card payment network using a payment card, the customer and the merchant can conduct a transaction using another form of payment, e.g., automated clearing house (ACH) payments, gift cards, loyalty purchases, or other payment mechanisms from a third party.

The payment service system 108 can also include an inventory management system 120. The inventory management system 120 manages items for sale by the merchant, e.g., using one or more databases. For example, the inventory management system 120 can store details for each item. The details can include a title, a price, a picture, quantity, a category, or a description of the item. In some implementations, the inventory management system 120 stores whether the item is available in store only, online only, or both. Therefore, the payment service system 108 can not only process financial transactions but can also manage inventory data for the merchant.

Through the inventory management system 120, the merchant can add, remove, or modify the inventory data. The merchant can use merchant device 104 or another device, e.g., a desktop device connected to the inventory management system 120. For example, the merchant can execute a merchant application on the merchant's mobile device. The merchant can add an item to the inventory data through an interface of the merchant application. The merchant application can send, e.g., through the Internet 106, the added item to the inventory management system 120, which stores the added item in one or more databases. In some other implementations, the merchant accesses, e.g., using a desktop computer, a web site that is hosted by the payment service system 108 and the merchant manages the inventory data through the web site.

The system can also include a customer device 110. The customer device 110 can interface with the payment service system 108 through the Internet 106. The customer device 110 can be a mobile device, a desktop device, or other data processing apparatus. For example, the customer device 110 can be used by a customer at home to make an online purchase using the payment service system 108.

Figure 2:
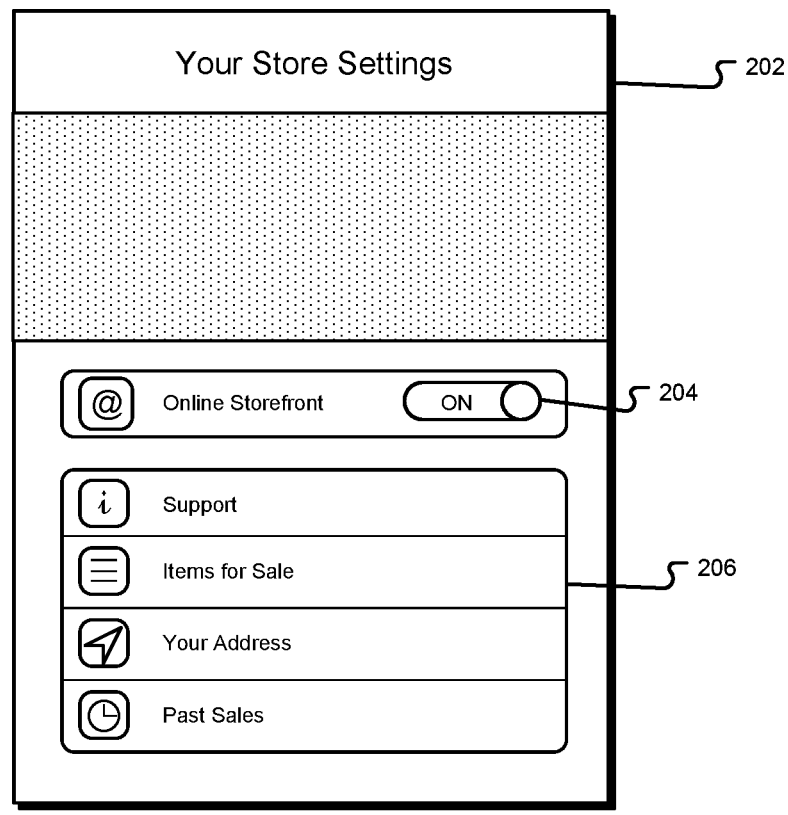
FIG. 2 is a schematic illustration of an example user interface for generating an online storefront.

FIG. 2 is a schematic illustration 200 of an example user interface 202 for generating an online storefront. A merchant can use the user interface 202 to configure settings of its inventory management system, e.g., the inventory management system 120 described above in reference to FIG. 1. The user interface 202 can be presented by a mobile device, e.g., the mobile device described above in reference to FIG. 1, or another electronic device. For example, the user interface 202 can display a single button 204 that, when activated, e.g., is "ON," generates an online storefront for the merchant. This will be described further below in reference to FIG. 3.

The user interface 202 can also present other settings 206 of the merchant. For example, the merchant can access support links, view or edit items for sale in the inventory, view or edit the merchant's address, and view past sales made to different customers.

Figure 3:
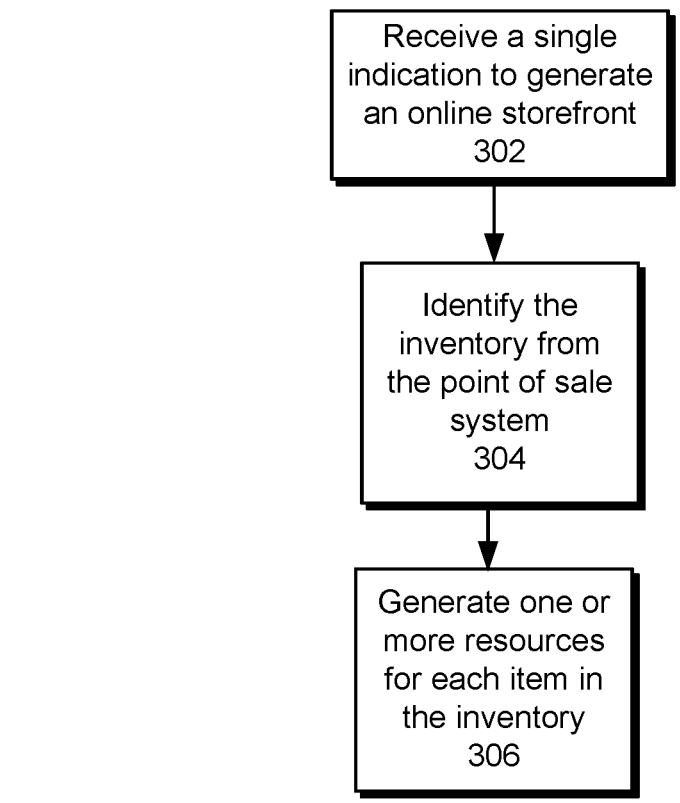
FIG. 3 is a flow chart of an example process of generating an online storefront.

FIG. 3 is a flow chart 300 of an example process of generating an online storefront. For convenience, the process will be described with respect to a system, e.g., the inventory management system as described above in reference to FIG. 1, having one or more computing devices that perform the process.

The system receives a single indication to generate an online storefront (step 302). The single indication can be one activated button, e.g., as described above in reference to FIG. 2. In some implementations, the single indication is a user selection, e.g., input from a merchant, of a button that is displayed on a user interface of a merchant's mobile device. In particular, the button can be a check-box with "Enable Virtual Storefront" as corresponding text. The mobile device can send an indication of the user selection to an inventory management system. As described above, the single indication can be received from a merchant application running on a merchant's point of sale device, e.g., an iPad used to conduct financial transactions, or a separate device that accesses inventory data of a merchant.

The system identifies the inventory from the point of sale system (step 304). For example, the system accesses an internal database of the point of sale system that stores the inventory data of the merchant. In particular, a merchant can be logged into the merchant application running on the mobile device. The mobile device can send, to the inventory management system, a login identification of the merchant along with the single indication. The inventory management system can identify the merchant's inventory based on the login identification of the merchant.

The system generates one or more resources for each item in the merchant's inventory (step 306). The system can also generate resources for groupings of items, e.g., a home page resource, a resource of most frequently purchased items, and/or a resource of items within a category. Categories can either be available online exclusively, in store exclusively, both online and in store, or only to a manager. Each resource can be accessible from a web domain. For example, the inventory management system can create, publish, and manage the web domain. The web domain can be a subdomain of a domain owned by the inventory management system. A customer can access the resource, e.g., through an Internet browser, from any device having an Internet connection.

Each generated resource includes details of one or more items in the inventory. The details can be obtained from the internal database that stores the merchant inventory data. The resource can also include executable instructions that enable the advertised item to be purchased by a customer. For example, the resource can be generated from a template including code that can process transactions based on user input, e.g., the instructions can submit financial information entered by a customer to a payment processing system. An example resource is described further below in reference to FIGS. 4A-B.

Each generated resource can also include a standard design that displays the details of the one or more items. For example, the resources can be generated from a template including style sheets, e.g., Cascading Style Sheets, or other design code.

After generating the resources, the merchant can customize the online storefront. For example, the system can provide an interface to customize appearance of the generated resources. The merchant can change background color, font types, font colors, design themes, or other design elements specified in the resources. The system can also provide an interface to display or hide one or more items or categories of the inventory data.

In some implementations, inventory data is modified after the online storefront is generated. For example, the merchant can add a new item using the merchant application to the inventory data after generating the online storefront. In this case, the system, upon receiving instructions to add the new item, e.g., through the merchant application, generates a new resource for the new item and publishes the new resource on the Internet. Therefore, items in the online storefront are synchronized with items in the inventory data.

In some implementations, the system receives a separate indication to deactivate the online storefront. For example, the merchant can deactivate the button described above in reference to FIG. 2. The system then removes public access to the online storefront, e.g., by removing the merchant's subdomain. In some implementations, the system maintains the storefront even though the storefront is not online, e.g., the system generates resources based on the inventory data but does not publish the resources. Therefore, a merchant can quickly republish the online storefront if desired.

Figure 4A:
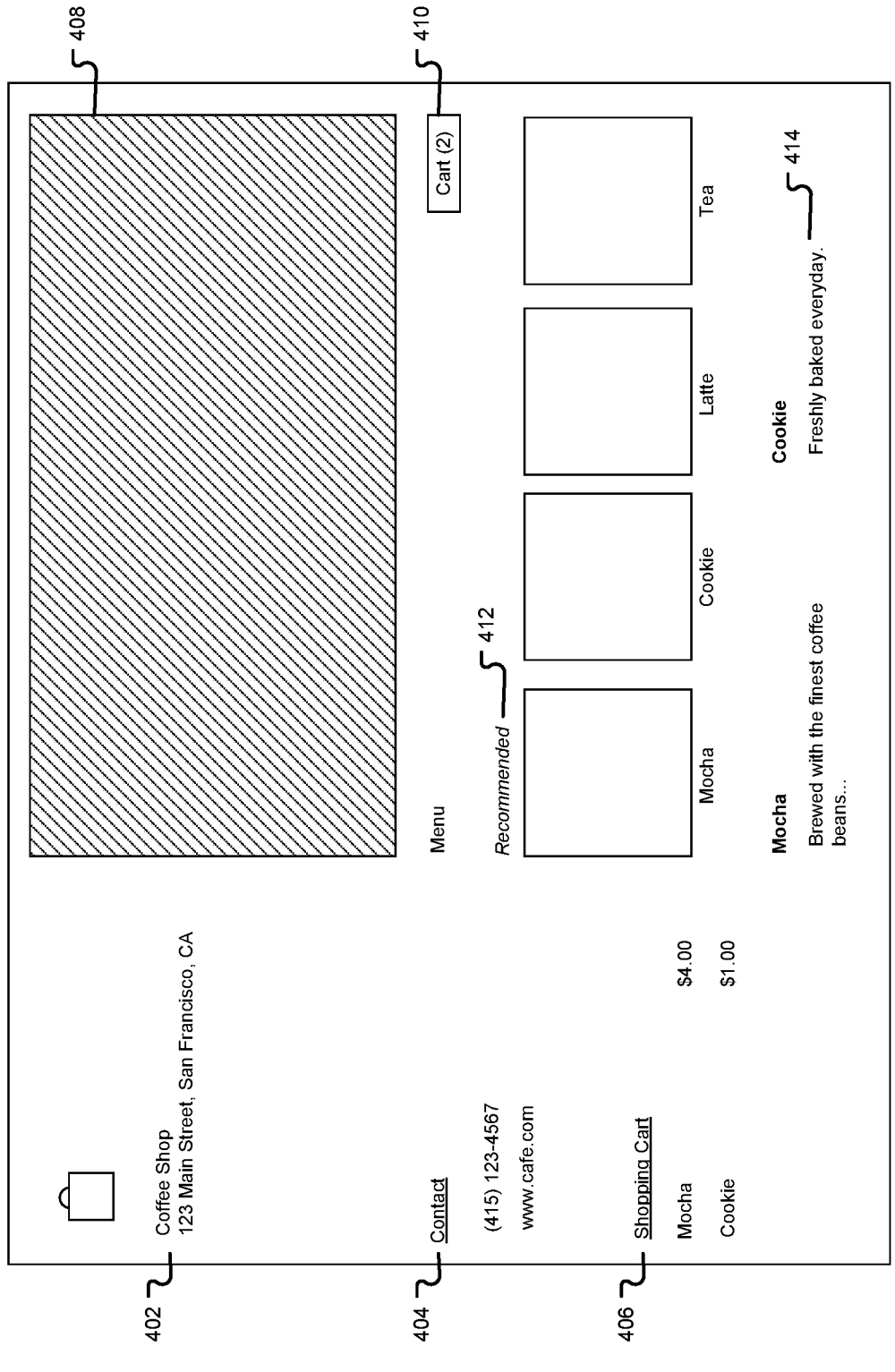
FIGS. 4A-B are schematic illustrations of example user interfaces of a generated online storefront.

FIG. 4A is an example user interface of a home page 400 of a merchant's online storefront. The storefront can display a name 402, an image 408, and contact information 402 of the merchant. The storefront can also display items in a shopping cart 406, 410. For example, the home page can display multiple items in the inventory of the merchant, e.g., recommended items 412, and a description for each item, e.g., description 414. The multiple items can be sorted by popularity. The popularity can be tracked by the inventory management system. For example, if one or more items sell more quickly than other items, the inventory management system can promote the one or more popular items on the online storefront. The home page can be displayed through a browser running on a computing device. A customer browsing the home page can access particular listings, e.g., by clicking on a link.

Figure 4B:
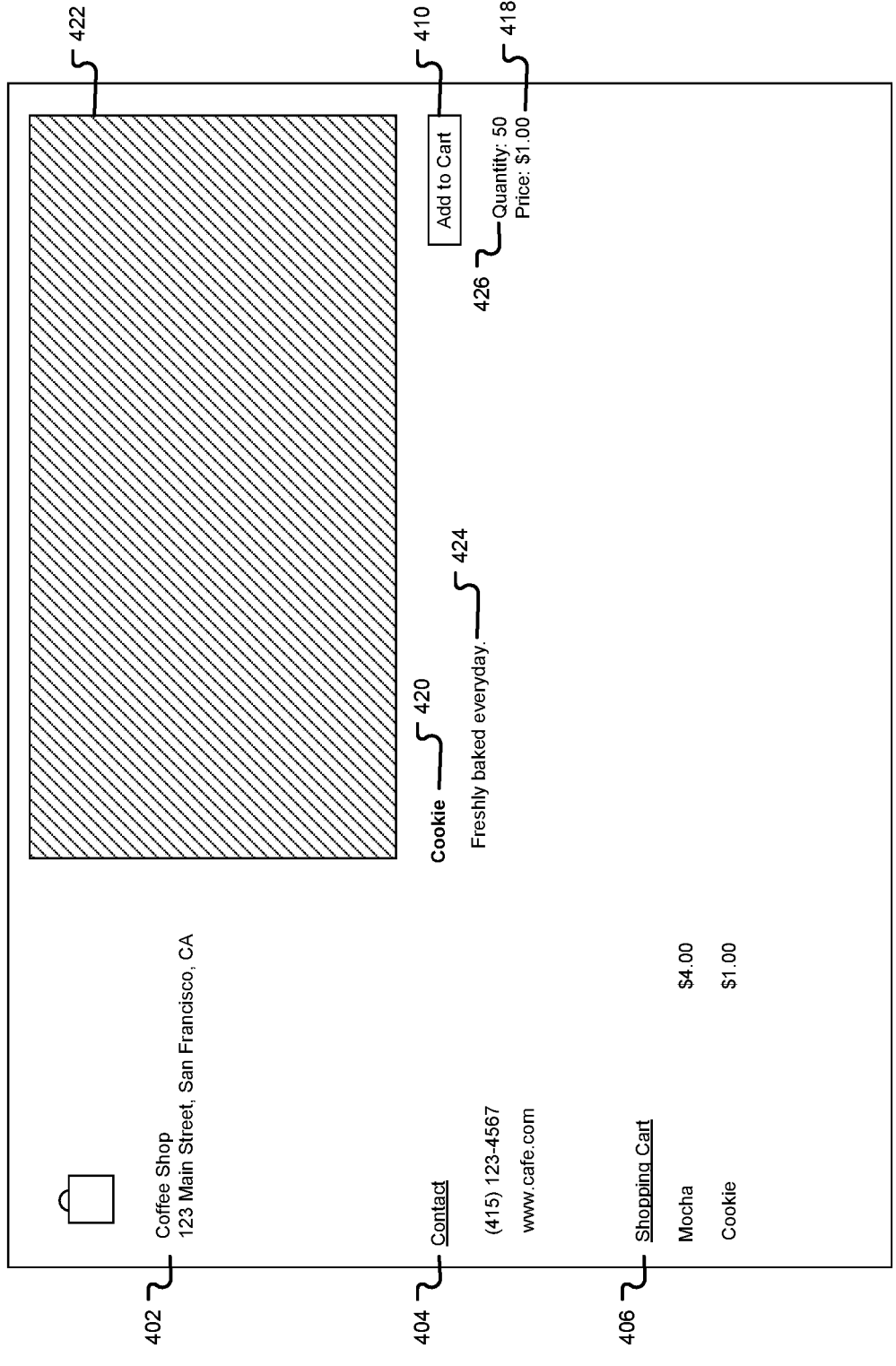

FIG. 4B is an example user interface 416 of a listing of an item in the merchant's inventory. The listing is a resource generated from the inventory management system. For example, the listing can display a picture 422, a title 420, a price 418, and a description 424 of the item. The listing can also display a remaining quantity 426 as stored in the inventory. A customer can view the listing through a computing device. The customer can purchase the item through the listing using purchase links displayed on the listing, e.g., the "Add to Cart" button 410. After adding to a cart, the customer can checkout and enter his or her financial information, e.g., a credit card number, through form inputs. In some implementations, the financial information is auto-filled by the payment service system. For example, the payment service system can already have stored the customer's financial information. The customer can also select whether the item will be picked up at the merchant store or delivered to the customer. Upon receiving user input to purchase the item, the computing device can submit the input to a payment processing system. The payment processing system can send an authentication of the transaction to the computing device. The computing device can display an indication of the authentication to the customer, e.g., display a successful purchase message. In some implementations, in addition to providing the item for purchase, the system provides the item for reservation.

In some implementations, after the payment processing system sends the authentication of the transaction to the computing device, the payment processing system updates inventory data of the merchant through the inventory management system. For example, the payment processing system can send, to the inventory management system, a command to decrement a stock quantity of the item after successfully processing payment information from the customer. As a result, the merchant's inventory is up to date. The inventory can be properly reflected in the merchant's brick and mortar store and the online storefront because both pull inventory data from the inventory management system. In some implementations, the payment processing system determines stock of the item is under a predetermined limit in the inventory and notifies the merchant of the low stock, e.g., through an email or in a dashboard of the merchant application.

In some implementations, after the customer purchases the item, the payment processing system determines an address of the customer. The customer could have entered his or her address before paying for it. Or, the customer can have an account with the payment processing system, and the account can be associated with the customer's address. For example, if the customer is known to the payment processing system during checkout, e.g., through a login, the payment processing system can then use the customer's stored financial information and address for delivery. In another example, the payment processing system can determine an address that is closest to the customer's current physical position, e.g., by receiving a Global Positioning Satellite (GPS) location from the customer device. The payment processing system can process the transaction based on the address. For example, the payment processing system can send the address to a third party fulfillment service, which sends the purchased item to the customer. Therefore, the merchant will not have access to the customer's address, thereby allowing the customer to maintain privacy. In some implementations, the payment processing system notifies the third party fulfillment service if one or more items are low in stock.

In some implementations, the customer can choose to share the address with the merchant, e.g., the customer shares the address through a setting in an account profile. The payment processing system can then forward the customer's address to the merchant upon successfully processing the customer's payment information.

Figure 5:
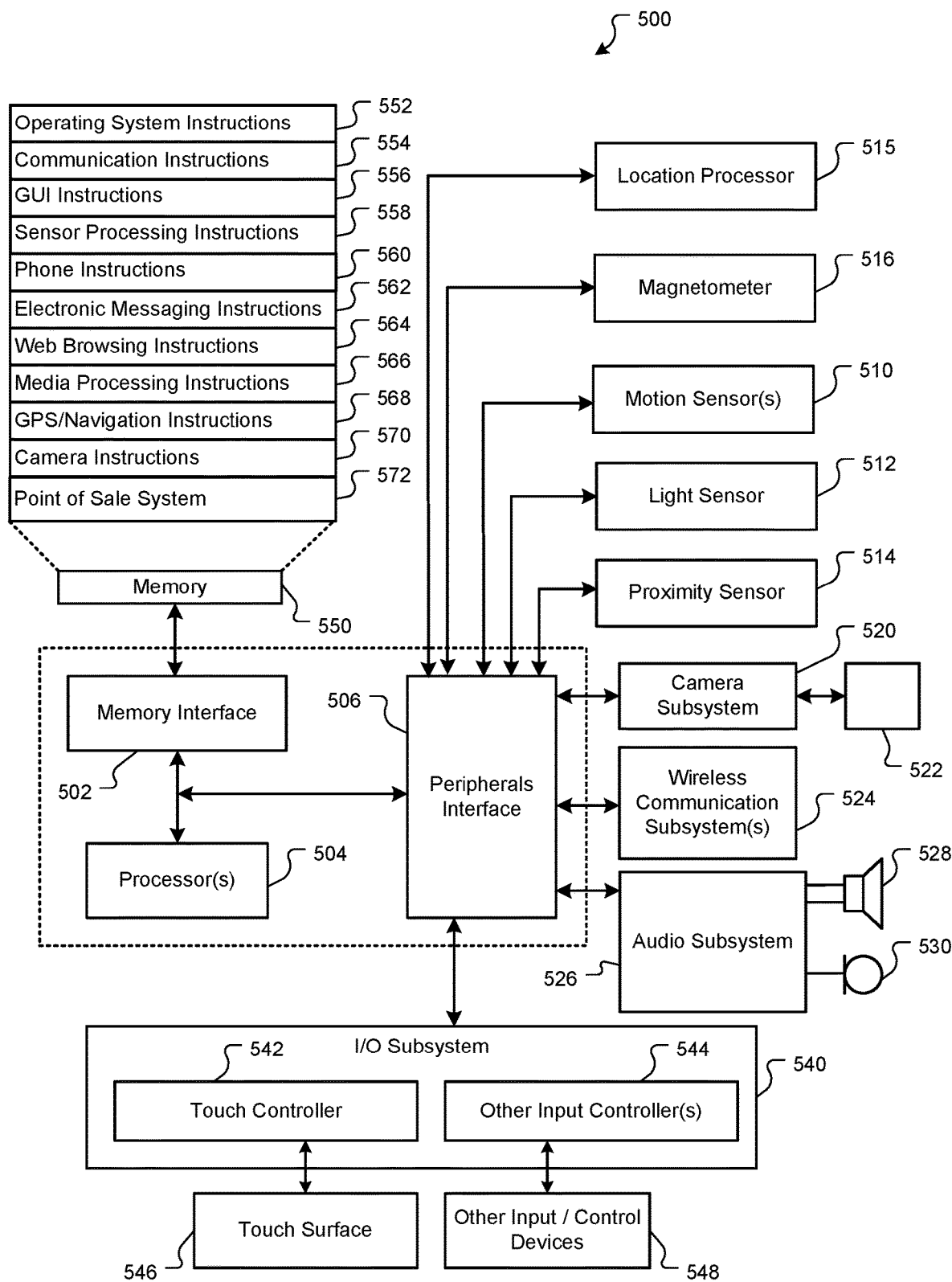
FIG. 5 is a block diagram of an exemplary architecture of a mobile device capable of serving as a point of sale.

FIG. 5 is a block diagram of an exemplary architecture of a mobile device capable of serving as a point of sale. Architecture 500 can be implemented in any device for generating the features described in reference to FIGS. 1-4, including but not limited to portable or desktop computers, smart phones and electronic tablets, television systems, game consoles, kiosks and the like. Architecture 500 can include memory interface 502, data processor(s), image processor(s) or central processing unit(s) 504, and peripherals interface 506. Memory interface 502, processor(s) 504 or peripherals interface 506 can be separate components or can be integrated in one or more integrated circuits. The various components can be coupled by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate orientation, lighting, and proximity functions of the device. For example, in some implementations, light sensor 512 can be utilized to facilitate adjusting the brightness of touch surface 546. In some implementations, motion sensor 510 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 506, such as a temperature sensor, a biometric sensor, or other sensing device, to facilitate related functionalities.

Location processor 515 (e.g., GPS receiver) can be connected to peripherals interface 506 to provide geo-positioning. Electronic magnetometer 516 (e.g., an integrated circuit chip) can also be connected to peripherals interface 506 to provide data that can be used to determine the direction of magnetic North. Thus, electronic magnetometer 516 can be used as an electronic compass.

Camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 524. Communication subsystem(s) 524 can include one or more wireless communication subsystems. Wireless communication subsystems 524 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 524 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 524 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 526 can be coupled to a speaker 528 and one or more microphones 530 to facilitate voice-enabled functions, such as voice recognition, voice replication, digital recording, and telephony functions.

I/O subsystem 540 can include touch controller 542 and/or other input controller(s) 544. Touch controller 542 can be coupled to a touch surface 546. Touch surface 546 and touch controller 542 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 can display virtual or soft buttons and a virtual keyboard, which can be used as an input/output device by the user.

Other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of speaker 528 and/or microphone 530.

In some implementations, device 500 can present recorded audio and/or video files, such as MP3, AAC, and MPEG files. In some implementations, device 500 can include the functionality of an MP3 player and may include a pin connector for tethering to other devices. Other input/output and control devices can be used.

Memory interface 502 can be coupled to memory 550. Memory 550 can include high-speed random access memory or non-volatile memory, such as one or more magnetic disk storage devices, one or more optical storage devices, or flash memory (e.g., NAND, NOR). Memory 550 can store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 can include a kernel (e.g., UNIX kernel).

Memory 550 may also store communication instructions 554 to facilitate communicating with one or more additional devices, one or more computers or servers. Communication instructions 554 can also be used to select an operational mode or communication medium for use by the device, based on a geographic location (obtained by the GPS/Navigation instructions 568) of the device. Memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions and display GUIs; media processing instructions 566 to facilitate media processing-related processes and functions; GPS/Navigation instructions 568 to facilitate GPS and navigation-related processes; camera instructions 570 to facilitate camera-related processes and functions; and instructions 572 for serving as a point of sale. The memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application specific integrated circuits.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by a server device managed by a payment-processing system, the method comprising:

receiving, by the server device managed by the payment-processing system, from a point-of-sale (POS) device of a merchant that uses the payment-processing system for processing payments, and at a first time, first transaction data associated with a brick and mortar (BOM) transaction between the merchant and a customer;

processing, by the server device, a payment for the BOM transaction;

updating, by the server device, inventory data associated with the merchant based at least in part on the first transaction data;

receiving, by the server device and from the POS device of the merchant at a second time that is different from the first time, a request to generate a graphical user interface for making available, to an ecommerce customer for online commerce, one or more items that are available to the customer during the BOM transaction with the merchant;

retrieving, by the server device and from a database associated with the server device, the inventory data associated with the merchant, the inventory data indicating the one or more items;

generating, by the server device, one or more resources for the one or more items indicated by the inventory data;

causing, by the server device, the graphical user interface comprising the one or more resources to be presented via a device operated by the ecommerce customer to enable the ecommerce customer to purchase an item of the one or more items from the merchant; and updating, by the server device, the inventory data based at least in part on second transaction data representative of a purchase of the item by the ecommerce customer via the graphical user interface.

2. The method of claim 1, further comprising:

receiving, from the device associated with the ecommerce customer, the second transaction data comprising a selection of the item for purchase and payment information; and processing an ecommerce transaction for the item based at least in part on the selection and the payment information, wherein the inventory data is updated based at least in part on the second transaction data.

3. The method of claim 1, further comprising:
receiving, from the device associated with the ecommerce customer, the second transaction data comprising a selection of the item for purchase;
accessing, from the database, customer data associated with the ecommerce customer; and
processing an ecommerce transaction for the item based at least in part on the selection and the customer data,
wherein the inventory data is updated based at least in part on the ecommerce transaction.

4. The method of claim 3, wherein the customer data comprises at least one of:
payment information associated with the ecommerce customer; or
an address associated with the ecommerce customer.

5. The method of claim 1, further comprising:
determining an arrangement of at least a portion of the one or more resources for presentation on the graphical user interface;
receiving, from the POS device, an input comprising a modification to the arrangement of the at least a portion of the one or more resources; and
modifying the arrangement based at least in part on the input.

6. The method of claim 5, wherein the modification comprises a change to at least one of:
a color;
a font; or
a design associated with the arrangement.

7. The method of claim 1, further comprising:
determining an arrangement of at least a portion of the one or more resources for presentation on the graphical user interface; and
identifying a group of items of the one or more items as frequently purchased items,
wherein determining the arrangement of the at least the portion of the one or more resources comprises presenting the group of items together on the graphical user interface.

8. The method of claim 1, further comprising:
receiving, from the device operated by the ecommerce customer, the second transaction data comprising a request to purchase the item, the request associated with a geolocation of the device;
determining an address associated with the geolocation of the device; and
sending the address to a third-party fulfillment service to cause the third-party fulfillment service to send the item to the ecommerce customer.

9. The method of claim 1, further comprising:
receiving, from the POS device, a request to deactivate the graphical user interface; and
removing the graphical user interface from an ecommerce platform.

10. A server computing device managed by a payment-processing system, the server computing device comprising:
one or more processors managed by the payment-processing system; and
one or more computer-readable media coupled to the one or more processors managed by the payment-processing system and having instructions stored thereon, which, when executed by the one or more processors, cause the one or more processors to perform operations comprising:
receiving, from a point-of-sale (POS) device of a merchant that uses the payment-processing system for processing payments at a first time, first transaction data associated with a brick and mortar (BOM) transaction between the merchant and a customer;
processing a payment for the BOM transaction;
updating inventory data associated with the merchant based at least in part on the first transaction data;
receiving, from the POS device of the merchant at a second time, a request to generate a graphical user interface for making available, to an ecommerce customer for online commerce, one or more items that are available to the customer during the BOM transaction with the merchant;
retrieving, from a database, the inventory data associated with the merchant, the inventory data indicating the one or more items;
generating one or more resources for the one or more items indicated by the inventory data;
causing the graphical user interface comprising the one or more resources to be presented via a device operated by the ecommerce customer to enable the ecommerce customer to purchase an item of the one or more items from the merchant; and
updating the inventory data based at least in part on second transaction data representative of a purchase of the item by the ecommerce customer via the graphical user interface.

11. The server computing device of claim 10, the operations further comprising:
receiving, from the device operated by the ecommerce customer, the second transaction data comprising a selection of the item for purchase and payment information;
processing an ecommerce transaction for the item based at least in part on the selection and the payment information; and
wherein the inventory data is updated based at least in part on the second transaction data.

12. The server computing device of claim 10, wherein the request to generate the graphical user interface is associated with a single interaction with an application associated with the POS device.

13. The server computing device of claim 10, the operations further comprising:
determining an arrangement of at least a portion of the one or more resources for presentation on the graphical user interface; and
identifying a group of items of the one or more items as frequently purchased items,
wherein determining the arrangement of the at least the portion of the one or more resources comprises presenting the group of items together on the graphical user interface.

14. The server computing device of claim 10, the operations further comprising:
determining an arrangement of at least a portion of the one or more resources for presentation on the graphical user interface;
receiving, from the POS device, an input comprising a modification to the arrangement of the at least a portion of the one or more resources; and
modifying the arrangement based at least in part on the input.

15. The server computing device of claim 14, wherein the modification to the arrangement comprises at least one of:

an adjustment to a presentation of at least one resource of the one or more resources; or an adjustment to merchant information presented in the arrangement.

16. A server system comprising:

one or more processors managed by a payment-processing system; and one or more computer-readable media coupled to the one or more processors managed by the payment-processing system and having instructions stored thereon, which, when executed by the one or more processors, cause the one or more processors to perform operations comprising:

receiving, from a point-of-sale (POS) device of a merchant that uses the payment-processing system for processing payments, and at a first time, first transaction data associated with a brick and mortar (BOM) transaction between the merchant and a BOM customer;

processing a payment for the BOM transaction;

updating inventory data associated with the merchant based at least in part on the first transaction data;

receiving, from the POS device of the merchant, and at a second time, a request to generate a graphical user interface for making available, to an ecommerce customer for online commerce, one or more items that are available to the BOM customer during the BOM transaction with the merchant;

retrieving, from a database, the inventory data associated with the merchant, the inventory data indicating the one or more items;

generating one or more resources for the one or more items indicated by the inventory data;

causing the graphical user interface comprising the one or more resources to be presented via a device operated by the ecommerce customer to enable the ecommerce customer to purchase an item of the one or more items from the merchant; and updating the inventory data based at least in part on second transaction data representative of a purchase of the item by the ecommerce customer via the graphical user interface.

17. The server system of claim 16, the operations further comprising:

receiving, from the device operated by the ecommerce customer, the second transaction data comprising a selection of the item for purchase and payment information;

processing an ecommerce transaction for the item based at least in part on the selection and the payment information; and wherein the inventory data is updated based at least in part on the second transaction data.

18. The server system of claim 16, wherein the request to generate the graphical user interface is associated with a single interaction with an application associated with the POS device.

19. The server system of claim 16, the operations further comprising:

determining an arrangement of at least a portion of the one or more resources for presentation on the graphical user interface; and identifying a group of items of the one or more items as frequently purchased items, wherein determining the arrangement of the at least the portion of the one or more resources comprises presenting the group of items together on the graphical user interface.

20. A method comprising:

receiving, by one or more server devices managed by a payment-processing system, from a point-of-sale (POS) device of a merchant that uses the payment-processing system for processing payments, and at a first time, first transaction data associated with a brick and mortar (BOM) transaction between the merchant and a BOM customer;

processing, by the one or more server devices, a payment for the BOM transaction;

updating, by the one or more server devices, inventory data associated with the merchant based at least in part on the first transaction data;

receiving, by the one or more server devices and from the POS device of the merchant at a second time that is different from the first time, a request to generate a graphical user interface for making available, to an ecommerce customer for online commerce, one or more items that are available to the BOM customer during the BOM transaction with the merchant;

retrieving, by the one or more server devices and from a database associated with at least one of the one or more server devices, the inventory data associated with the merchant, the inventory data indicating the one or more items;

generating, by the one or more server devices, one or more resources for the one or more items indicated by the inventory data;

causing, by the one or more server devices, the graphical user interface comprising the one or more resources to be presented via a device operated by the ecommerce customer to enable the ecommerce customer to purchase an item of the one or more items from the merchant; and updating, by the one or more server devices, the inventory data based at least in part on second transaction data representative of a purchase of the item by the ecommerce customer via the graphical user interface.

* * * * *